(12) United States Patent
Ward (10) Patent No.: US 9,119,458 B2
(45) Date of Patent: Sep. 1, 2015

(54) PORTABLE, WEARABLE DISPLAY DEVICE

(71) Applicant: FASTENFO, INC., Chicago, IL (US)

(72) Inventor: Hilary J. Ward, Chicago, IL (US)

(73) Assignee: FASTENFO, INC., Chicago, IL (US)

( * ) Notice: Subject to any disclaimer, the term of this patent is extended or adjusted under 35 U.S.C. 154(b) by 222 days.

(21) Appl. No.: 13/794,181

(22) Filed: Mar. 11, 2013

(65) Prior Publication Data

US 2014/0254142 A1    Sep. 11, 2014

(51) Int. Cl.
*A45F 5/00* (2006.01)
*G06F 1/16* (2006.01)

(52) U.S. Cl.
CPC ... *A45F 5/00* (2013.01); *G06F 1/16* (2013.01); *A45F 2005/008* (2013.01)

(58) Field of Classification Search
CPC ..................................... A45F 5/00; G06F 1/16
USPC ......... 224/267, 576, 191, 587, 219, 222, 231, 224/929; 40/586; 63/11, 1.13, 3
See application file for complete search history.

(56) References Cited

U.S. PATENT DOCUMENTS

| | | | |
|---|---|---|---|
| 4,502,298 A | 3/1985 | Benton | |
| 5,400,936 A | 3/1995 | Jones et al. | |
| 6,325,229 B1 | 12/2001 | Anders | |
| 6,644,694 B2 * | 11/2003 | Seawright | 283/34 |
| 7,347,019 B1 | 3/2008 | Shaw | |
| 2003/0155389 A1 * | 8/2003 | Swartzentruber | 224/164 |
| 2003/0221449 A1 | 12/2003 | DeShong et al. | |
| 2009/0289776 A1 * | 11/2009 | Moore et al. | 340/10.41 |
| 2012/0324945 A1 * | 12/2012 | Koeppel | 63/1.13 |
| 2013/0283856 A1 * | 10/2013 | Sherrouse | 63/1.14 |
| 2014/0130234 A1 * | 5/2014 | King et al. | 2/170 |

OTHER PUBLICATIONS

Anthony Ramirez, Turning Profits Hand Over Wrist, The New York Times, Oct. 27, 1990, pp. 31 and 41.

* cited by examiner

*Primary Examiner* — Justin Larson
*Assistant Examiner* — Phillip Schmidt
(74) *Attorney, Agent, or Firm* — Cherskov Flaynik & Gurda, LLC (57) ABSTRACT

The present invention relates to a portable informational display device capable of being worn by a user. The device comprises a body-mounted band, wherein said band has a first outwardly facing surface and a second inwardly facing surface and a substrate having a first end and a second end whereby said first end depends from said second inwardly facing surface, wherein said substrate contains an informational display.

19 Claims, 7 Drawing Sheets

PORTABLE, WEARABLE DISPLAY DEVICE

BACKGROUND OF THE INVENTION

1. Field of the Invention

The present invention relates to a device that can be worn on a user's arm or leg that features an informational display.

2. Background of the Invention

Tourists and visitors often require informational displays, such as maps, to navigate city streets, museums, theme parks, festivals, conventions, concerts, and the like. Currently available maps and displays are typically bulky and difficult to fold. Further, users have to store these maps in their pockets, backpacks, and purses, which not only makes them difficult to access while on the go but also it causes them to degrade faster.

Moreover, tourists and visitors often enjoy keeping trinkets including these displays for sentimental reasons. However, current display devices often become too degraded to keep. Additionally, users usually do not find these displays engaging enough to desire keeping them for sentimental reasons.

The state of the art provides no solutions that remedy the cumbersome and boring nature of typical display devices.

A need exists in the art for a device that allows a user to easily store and quickly retrieve information contained in an informational display. This display device should engage the user so as to provide enjoyment and sentimental value. The device should also be relatively inexpensive so that it can take the place of current displays.

SUMMARY OF INVENTION

An object of the present invention is to provide an informational display device that is easily stored. A feature of the present invention is that it can be securely worn on the user's wrist or ankle. An advantage of the present invention is that it eliminates the need to rummage through one's pockets, backpack, and purse for the informational display.

Another object of the present invention is to provide a device for stowing, deploying, then restowing indicia. A feature of the present invention is that it utilizes a bi-stable band as a means to both stow the indicia and protect the indicia from the environment while simultaneously worn on the user's wrist or ankle. An advantage of the present invention is that it provides portability and concealability to a heretofore bulky media.

Still another object of the present invention is to provide a concealable means for transporting communication devices on a person. A feature of the present invention is that a flexible view screen is stowed, deployed and then restowed underneath a bi-stable band worn by the person. An advantage of the concealable means is that the public is not aware of the user's possession of the communication device simultaneous with the user displaying the device in full view and with immediate accessibility of the device.

Yet another object of the present invention is to provide a method for stowing, deploying and then restowing indicia. A feature of the present invention is that it conceals indicia while the device is in full view of the public. An advantage of the method is that the user can wear the device containing indicia without the public knowing of the existence of the indicia.

Yet another object of the present invention is to provide a relatively low-tech alternative to smart-phone and GPS devices. A feature of the present invention is that it does not require Wi-Fi, satellite, or mobile phone telecommunication signals or a power supply. An advantage of the present invention is that it can be utilized anytime the user needs to access information regardless of access to outside signals or a supply of power.

The present invention is a portable informational display device worn by a user. The device comprises a bi-stable ribbon defining a first extended configuration and a second retracted position wherein the bi-stable ribbon has a first surface and a second surface; and a substrate has a first end attached to said second surface whereby said substrate is adapted to reside between said ribbon and the user when the device is worn by the user.

BRIEF DESCRIPTION OF THE DRAWINGS

The invention together with the above objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings. As used herein, an element step recited in the singular and preceded with the word "a" or "an" should be understood as not excluding plural said elements or steps, unless such exclusion is explicitly stated. Furthermore, the references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The present invention provides an indicia storage/display device that pedestrians or runners can wear on their wrists or ankles. The device can be applied and removed conveniently with a single hand. Further, it is lightweight and portable. Also, while being worn by the user, it is not apparent that the band contains an informational display. That is, a casual observer would only notice that the user is wearing a bracelet.

This invention envisions several different embodiments. The mount worn by the user can be any suitable mount including but not limited to a bi-stable, or slap band, a watch strap, a bracelet, or any of a variety of wrist bands featuring a clasp, Velcro, or tie. Though the invention is not limited to bi-stable bands, the embodiments of the invention being described herein will focus on bi-stable bands. Bi-stable bands are a form of spring which can exist in two stable mechanical shapes—in this case, a first extended shape and a second curled shape. Generally, the spring is a strip of metal such as stainless steel or aluminum, but plastic strips have also been used. The strip is then encased in a material that is comfortable for the user to wear and which protects the user from any sharp surfaces on the metal or plastic strip. Typical encasing materials include silicone, cloth fabric, rubber, and PVC to name a few. Embodiments that utilize a plastic strip will be nonmetallic and radiotranslucent. These properties would be particularly useful for users that frequently travel through airport scanners.

In bi-stable band, the metal strip is curved along the longitudinal axis. This curvature stabilizes the spring in the extended position. When energy is input by the user, i.e., by "slapping" it on an appendage, the metal strip will recover to its second stable configuration. In the case of a bi-stable band, that second stable configuration is a curled position. The user can then uncurl the band and place it in the first stable, extended position.

The bi-stable band serves as a storage device for an informational display, which depends from the surface of the band contacting the user. The informational display, or substrate, can be used to convey a multitude of information including city, theme park, and festival maps; concert performance line-ups; weather reports; or a list of tourist attractions to name a few possibilities. Further, the substrate can be paper, flexible polymers, or a flexible computer screen among other possibilities. The device can also be adapted to house monitoring, tracking, locating, or contactless payment equipment such as RFID chips.

Figure 1:
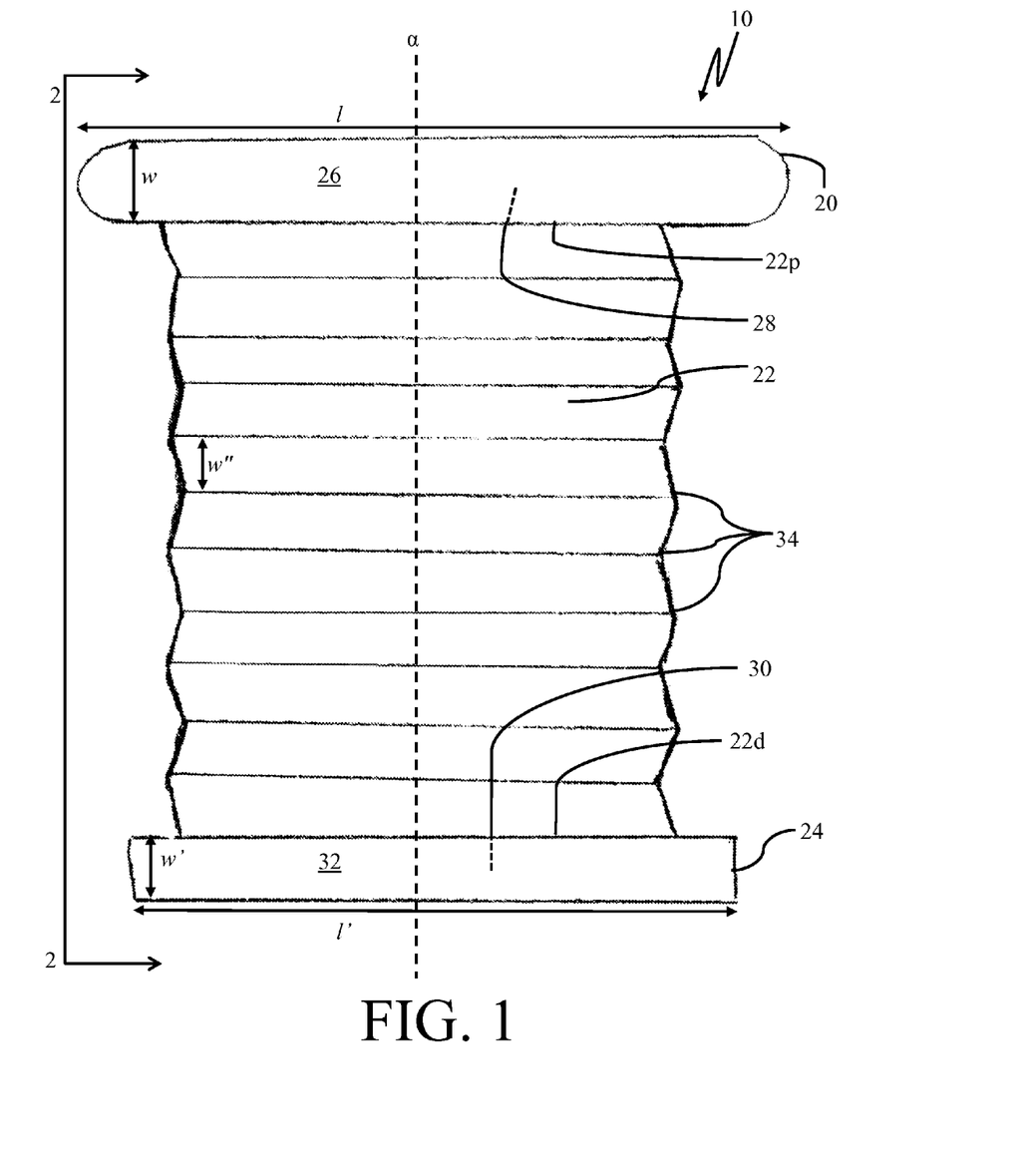
FIG. 1 is a front elevational view of an indicia stowage and display device in deployed configuration, in accordance with features of the present invention.
Figure 5:
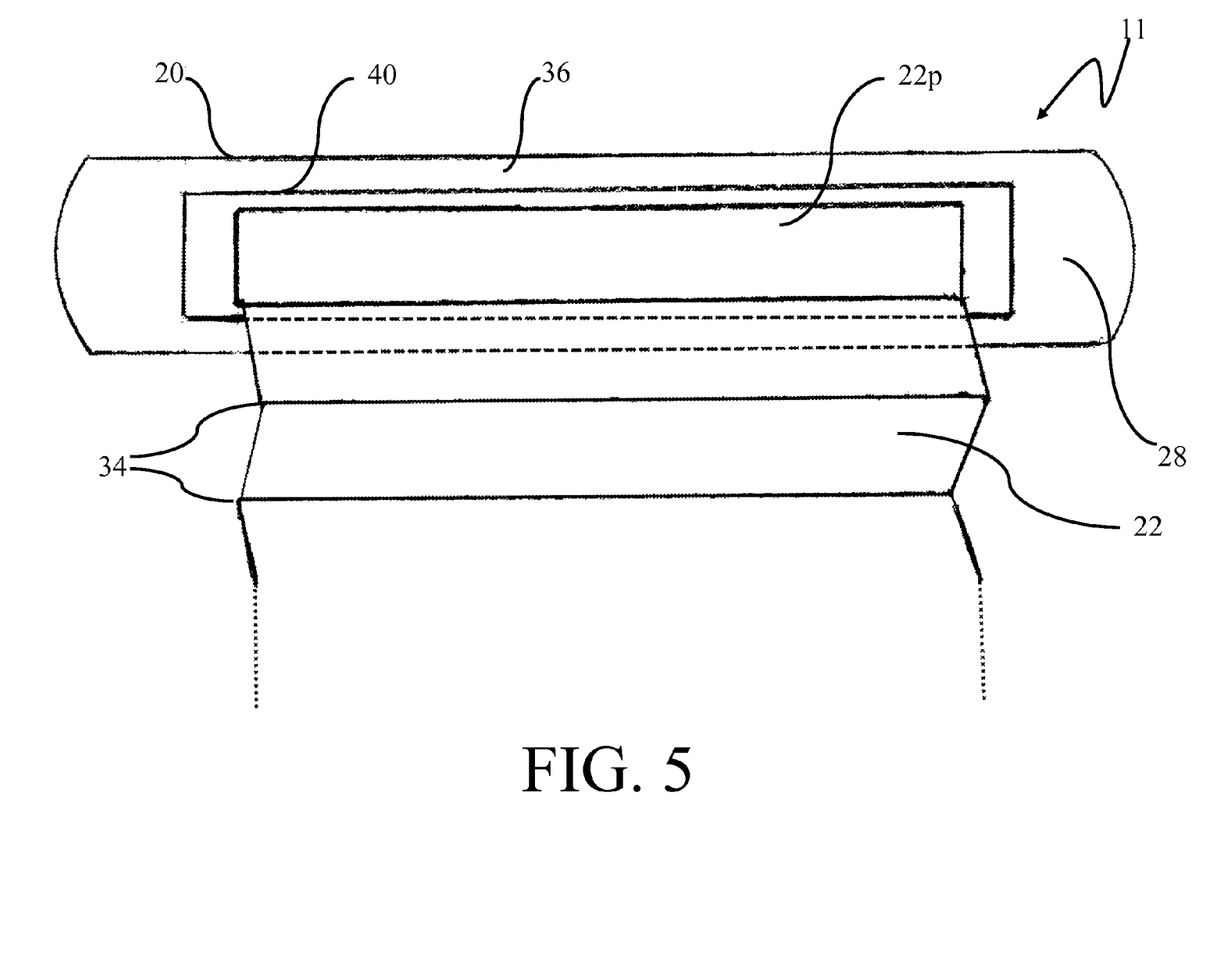
FIG. 5 is a partial elevation view an alternative embodiment of an indicia stowage and display device, in accordance with features of the present invention.

FIGS. 1 and 5 depict alternative embodiments of the device, designated as numerals 10 and 11, respectively.

Figure 4:
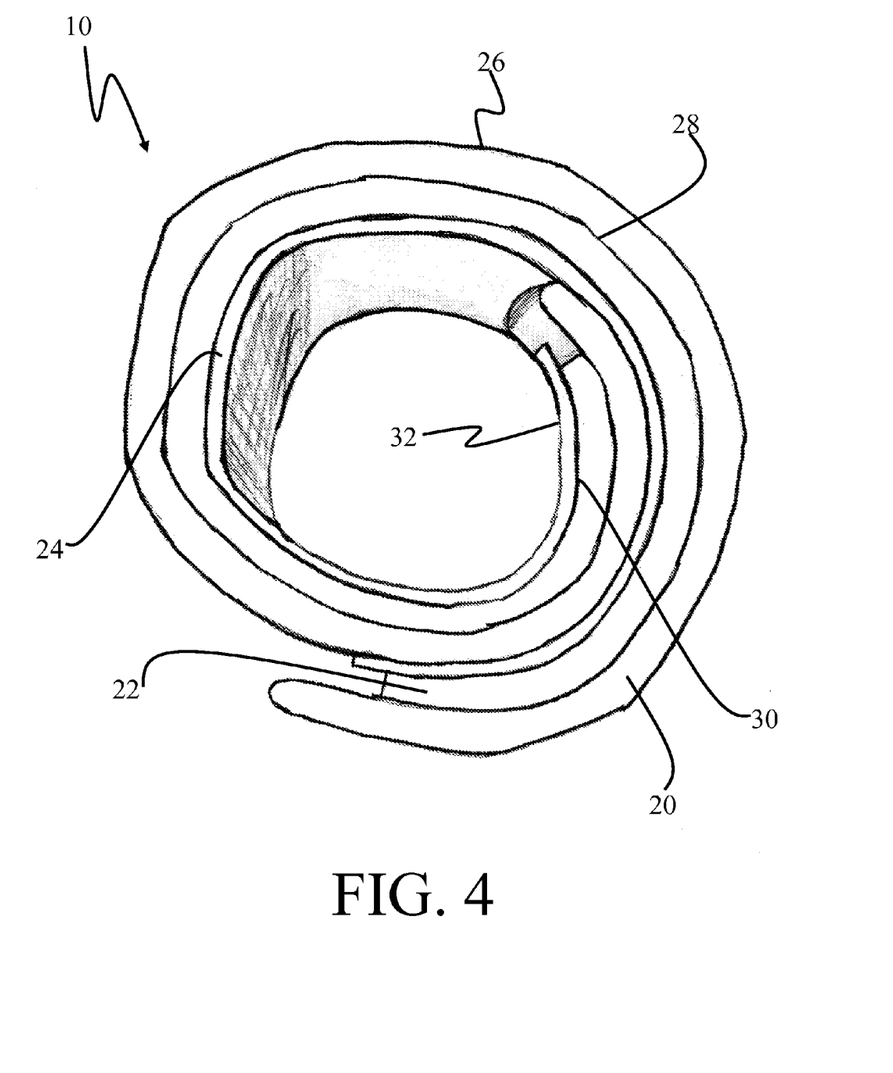
FIG. 4 is a depiction of an indicia stowage and display device as worn by the user, with the wearer's wrist depicted in phantom, in accordance with features of the present invention.

Generally, the device has two positions. As can be seen in FIG. 1, there is a first extended position from which information can be displayed. As can be seen in FIG. 4, there is a second retracted position that stores the information display and allows the user to wear the device.

In the first embodiment of the invention as depicted in FIG. 1, the device 10 comprises three basic elements: a first bi-stable band 20, a substrate 22, and a second bi-stable band 24. The second bi-stable band 24 is optional but is preferable. The substrate 22 has a first proximal end 22$p$ and a second distal end 22$d$. The first bi-stable band 20 has two surfaces defined by its length l and width w: a first surface 26 and a second surface 28. The first proximal end 22$p$ of the substrate 22 is reversibly or permanently joined to the second surface 28 of the bi-stable band 20.

The second bi-stable band 24 is of a length l' and width w'. In an embodiment of the invention, the length l' and width w' of the second bi-stable band 24 are less than the length l and width w of the first bi-stable band 20. In this way, the first bi-stable band 20 can conceal the presence of the second bi-stable band 24 for aesthetic reasons. The second bi-stable band 24 features a first surface 30 and a second surface 32. The second distal end 22$d$ of the substrate 22 is reversibly or permanently joined to the first surface 30 of the second bi-stable band 24. The second surface 32 of the bi-stable band 24 contacts the user while the device is being worn. If the second bi-stable band 24 is not used, then the distal end 22$d$ of the substrate 22 contacts the user's body.

Figure 2:
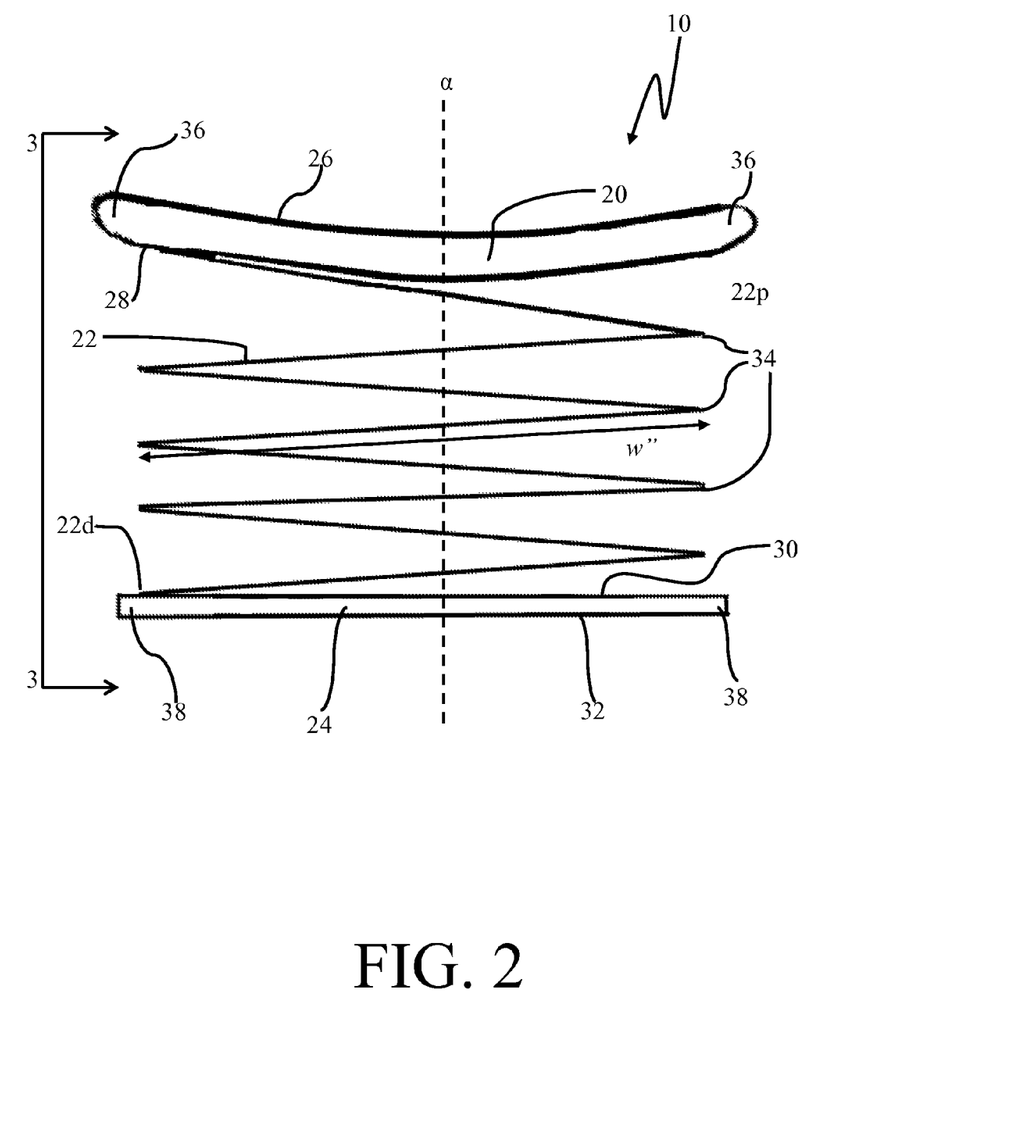
FIG. 2 is a sideview of FIG. 1 taken along the line 2-2 but with the indicia compressed along a longitudinal axis α of the device, in accordance with features of the present invention.

As depicted in FIG. 1, the substrate 22 is in the extended position. In this position, the user can access the information stored on the substrate 22. When the user is not accessing the information and wants to store the substrate 22, the substrate 22 can be compressed along axis α by folding along the z-fold lines 34 as can be seen in FIG. 2. The width w" of each z-fold 34 is preferably smaller than or equal to the width w' of the second bi-stable band 24, but larger widths can be accommodated. If the second bi-stable band 24 is not used, then the width w" is preferably smaller than or equal to the width w of the first bi-stable band w. Again, however, larger widths can be accommodated.

When the width w" of the z-folds 34 is smaller than either width w or w', the overhang 36 of the first bi-stable band 20 and the overhang 38 of the second bi-stable band 24 serve to shield the substrate 22 from the ambient elements.

Figure 3:
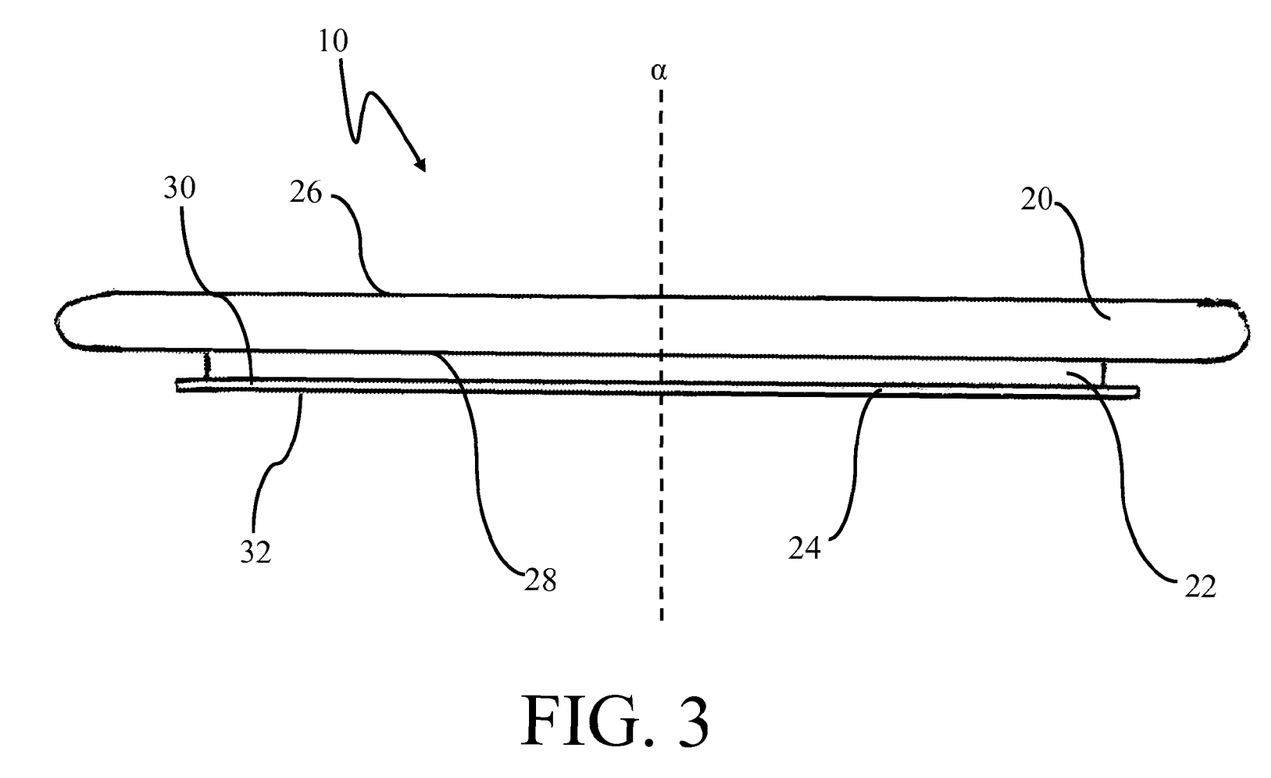
FIG. 3 is a front view of an indicia stowage and display device taken along line 3-3, with the indicia in an undeployed configuration so as to be substantially compressed along the longitudinal axis α of the device.

As the substrate 22 is compressed, the distance between the first bi-stable band 20 and the second bi-stable band 24 is decreased until the z-folds 34 are substantially collapsed as can be seen in FIG. 3.

When the substrate 22 is fully compressed so as to be in a nested or undeployed configuration, the device can be curled into the second retracted position as depicted in FIG. 4. In the retracted position, the user can wear the device on his or her arm or leg. In this way, the map or informational display depicted on the substrate 22 is readily accessible and fully visible at all times while worn by the wearer without the inconvenience of having to rummage through one's pockets, purse, or backpack.

In operation, the user mounts the device 10 on an appendage of the user and removes again with a single hand. When the device 10 is in the extended position and the substrate is compressed, the user can "slap" the band on the wrist or ankle, actuating the bi-stable ribbons 20 and 24 such that the ribbons coil onto themselves. Actuating the bi-stable ribbons 20 and 24 causes the band to curl into the second retracted position around the user's wrist or ankle. When the user desires to remove the device 10, the user uncurls the band by pulling from one end with his or her free hand. Upon application of a small amount of force at both ends of the bi-stable band, the device 10 will recover to the first extended position.

Figure 6:
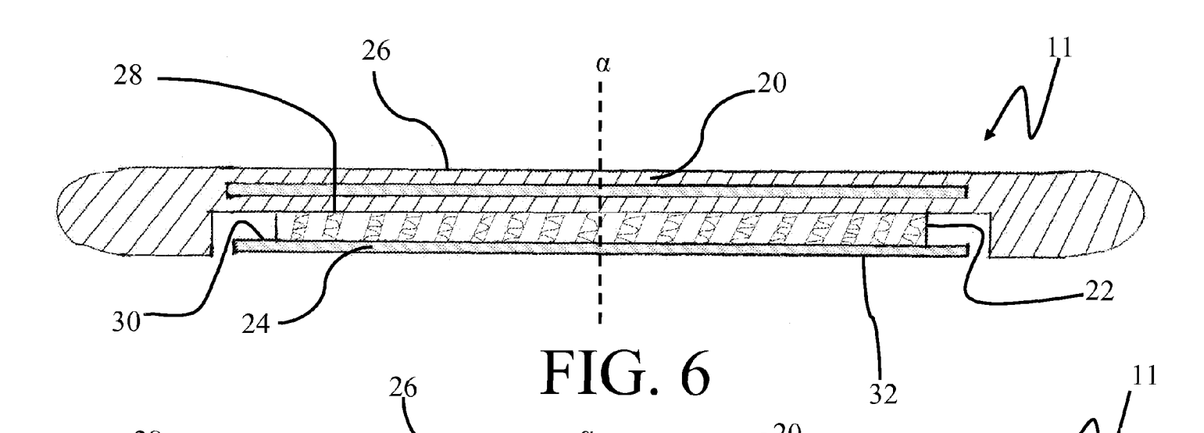
FIG. 6 is a sectional sideview of FIG. 5 displaying the countersunk region, in accordance with features of the present invention.
Figure 7:
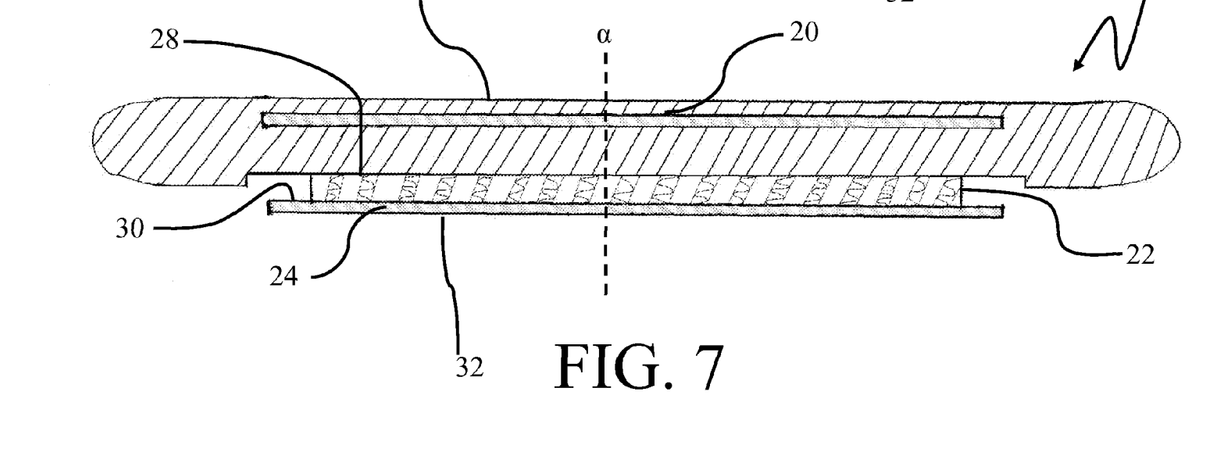
FIG. 7 is also a sectional sideview of FIG. 5 with a shallower countersunk region, in accordance with features of the present invention

In a second embodiment 11, as can be seen in FIG. 5, a countersunk region 40 is formed into the second surface 28 of the bi-stable band 20 to provide more shelter for the substrate 22. The cross section dimensions of the countersunk region 40 are larger than the surface area of the second bi-stable band 24 so that it can accommodate the compressed substrate 22 and second bi-stable band 24. In those embodiments, the first proximal end 22$p$ of the substrate 22 is joined to the portion of the second surface 28 of the first bi-stable band 20 that resides within the bevel 40. FIG. 6 is a sectional sideview of FIG. 5, which depicts the substrate 22 and second bi-stable band 24 nested completely in the countersunk region 40. FIG. 7 is also a sectional sideview of FIG. 5, which depicts a shallower countersunk region 40. In FIG. 7, the substrate 22 and second bi-stable band 24 are protruding slightly above the level of the second surface 28 of the first bi-stable band 20. In this manner, body temperature conduction to the substrate will be enhanced in FIG. 7 so as to keep the indicia pliable in the cold.

Figure 8:
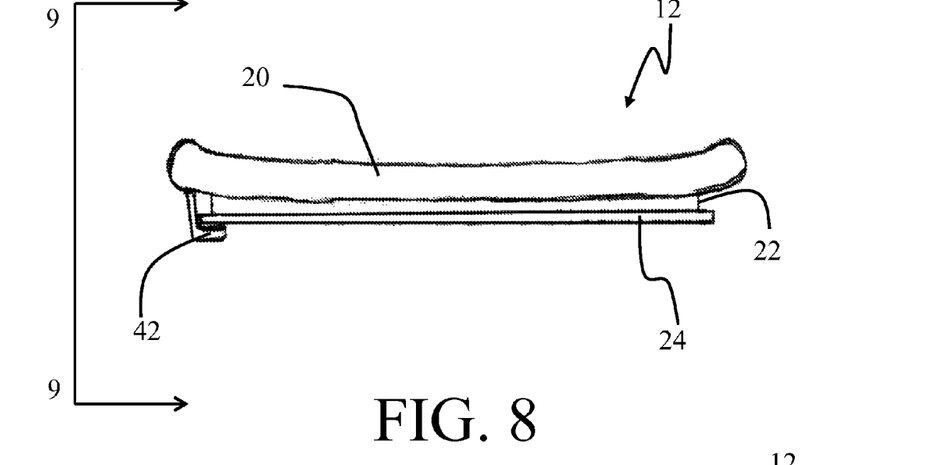
FIG. 8 is a sideview, similar to FIG. 2, of another alternative embodiment featuring a clasping overhang, in accordance with features of the present invention.
Figure 9:
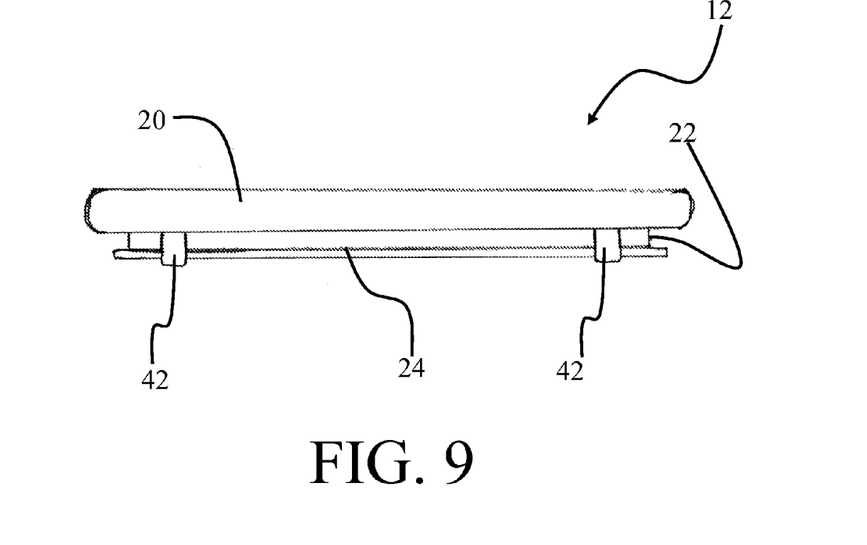
FIG. 9 is a front view of the indicia stowage and display device of FIG. 8 taken along line 9-9, in accordance with features of the present invention.

In a third embodiment 12, as can be seen in FIGS. 8 and 9, a clasping overhang 42 holds the substrate 22 in the compressed position while the device is not on the user's body.

The clasping overhang 42 depends from the second surface 28 of the first bi-stable band 20. As can be seen in FIG. 9, multiple clasping overhangs can be used. In FIG. 9, the clasping overhangs 42 are placed on the same side and at each end of the device 12; however, other embodiments are easily envisioned in which there is only a single clasping overhang 42 or in which the clasping overhangs 42 are on opposite sides of the device 12. The clasping overhangs 42 also help keep the substrate 22 from deploying while the user uncurls the device 12 from the second retracted position to the first extended position or while the user is attempting to go from the first extended position to the second retracted position. In this manner, the clasping overhangs 42 help make deployment and storage of the device 12 more efficient. The inventor has found silicone to be a suitable material for the clasping overhangs 42, but other materials are contemplated including rubber; metals such as tin, aluminum, and copper; and plastics like polyethylene and PVC.

There are several advantages inherent in the design of the present invention. First the component pieces are relatively inexpensive. Bi-stable bands, or "slap bands," can be purchased in large quantities and can be found at a multitude of retailers. These devices serve to replace traditional folding maps, as the components of the device (i.e., the slap bands) can be removed from one map to another.

This makes the device infinitely customizable to a person's changing travel venues. Also, not only can the user tailor the wording, colors, and design of the slap band to his or her specific needs and tastes but also the substrate can be customized for a variety of locales, events, or informational needs. Third, the devices are fun to wear and use. In this manner, users will be more inclined to keep them as souvenirs, thereby increasing their effectiveness for marketing and advertising purposes.

A multitude of materials can be used in the construction of these devices. The substrate 22 can be made of a variety of papers or fabrics. Because the substrate 22 will be folded and unfolded several times, durability is preferable. Also, because the substrate 22 will be exposed to the elements such as rain or snow and because the close proximity to the user's body could expose the substrate 22 to sweat, waterproofing is another option. TYVEK® paper has been found to have exceptional durability and waterproofing for the purposes of the present invention. Further, TYVEK® is UV resistant, and it can be printed on using a digital press, dot-matrix, or screen printing processes in such a way that the ink will not run if the TYVEK® becomes wet. The inventor has found TYVEK® model no. 1025D to be a suitable substrate. However, substrates with different properties may be chosen depending on the needs of the user.

Further, advances have been made in the area of flexible computer screens. Such screens could be used as the substrate 22 in the present invention or incorporated into the first bi-stable band 20. These screens are typically made of organic light emitting diodes (OLED). OLED screens have already been deployed in televisions, mobile phones, and cameras, and they would lend themselves well to wrist mounted display devices. Electrophoretic ink, or E Ink, is another candidate substrate for flexible screens. These screens are capable of producing grayscale displays, and further, E Ink displays have very low power consumption, which means that they will be able to hold a charge for a longer time.

As well, there are several suitable means for joining the proximal and distal ends 22p and 22d of the substrate 22 to the bi-stable bands 20 and 24. Permanent alternatives such as glues and other adhesives can be used. For removable alternatives, the proximal and distal ends 22p and 22d of the substrate 22 and bi-stable bands 20 and 24 can be joined with VELCRO®, magnets, or a tongue and groove configuration in which a slit extends longitudinally along each bi-stable band and a tongue adapted to fit said slit is attached to each end of the substrate, among other possibilities.

Because the device has obvious application in the tourism industry, radio-frequency identification (RFID) chips can be embedded in the device to provide valuable feedback to distributors and to increase convenience for users. Such incorporation could easily be achieved as RFID chips of this type are quite small, some barely larger than a grain of rice. RFID chips are frequently used to track the movement of goods and people. They also are used as a means of payment delivery, such as in open-road tolling. In an amusement park, for example, these two properties could have great applicability. The substrate 22 could consist of a park map on one side and a list of attractions or events on the other. The distributor would then deploy RFID monitors at each ride and vendor so that it could then track the volume of customers that visit each location, providing invaluable information as to trends in consumer preferences. As to the guest, money could be "loaded" on their personal RFID signal so that they could conveniently pay for rides, concessions, or souvenirs.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property right or privilege is claimed is defined as follows:

1. A portable informational display device capable of being worn by a user, the device comprising:
   a) a first bi-stable ribbon defining a first flat position and a second curled position and wherein said first bi-stable ribbon has a first surface and a second surface; and
   b) a substrate having a first end and a second end and longitudinal edges disposed between the first end and second end, wherein the first end is attached to said second surface, wherein said substrate is adapted to reside between said first bi-stable ribbon and the user when the device is worn by the user, wherein said substrate has a first extended position in which the substrate extends away from the second surface when the first bi-stable ribbon is in the flat position and a second compressed position in which the second end is brought into proximity of the first end such that the first bi-stable ribbon can be curled into the second curled position, and wherein said substrate contains an informational display.

2. The portable informational display device of claim 1 further comprising a second bi-stable ribbon at a second end of the device wherein the second bi-stable ribbon has a first flat position and a second curled position and wherein the second bi-stable ribbon has a first surface attached to the second end of the substrate and a second surface that contacts the user.

3. The portable information display device of claim 2 wherein the second surface of the first bi-stable ribbon has a countersunk region capable of housing the compressed substrate and the second bi-stable ribbon.

4. The device as recited in claim 2, wherein the length and width of the second bi-stable ribbon are equal to or less than the length and width of the first bi-stable ribbon.

5. The portable informational display device of claim 1 wherein said first bi-stable ribbon extends past the longitudinal edges of said substrate shielding the substrate from ambient elements while the device is being worn.

6. A portable informational display device capable of being worn by a user, the device comprising:
   a) a body-mounted band, wherein said band has a first outwardly facing surface and a second inwardly facing surface; and
   b) a substrate having a first end and a second end separated along a longitudinal axis, wherein said first end depends from said second inwardly facing surface, wherein said substrate contains an informational display, wherein the substrate is compressible along its longitudinal axis, and wherein said substrate is configured as a plurality of z-folds such that the width of each z-fold is no greater than approximately the width of the body-mounted band.

7. The device as recited in claim 6 wherein a substantial portion of the length of the substrate's second end is in contact with the user when the device is worn by the user.

8. The portable informational display device of claim 6 wherein the substrate is a flexible computer screen.

9. The portable informational display device of claim 6 wherein the substrate is an electrophoretic ink display.

10. The portable informational display device of claim 6 further comprising an embedded RFID tag.

11. The portable informational display device of claim 6 wherein the device is attached to and deployed from the wrist using a single motion hand.

12. The portable information display device of claim 6 wherein the substrate is tear-proof, waterproof, and able to be printed on.

13. The portable information display device of claim 12 wherein the substrate is made from synthetic fabric.

14. The portable information display device of claim 6 wherein at least one clasping overhang depends from the second surface of the body-mounted band so as to maintain the substrate in the compressed position.

15. The device as recited in claim 6, wherein the width of the body-mounted band is wider than the width of the compressed substrate.

16. The device as recited in claim 6, wherein the information display is selected from the group consisting of a map, a list of attractions, an itinerary, a photograph, a schedule, and combinations thereof.

17. The device as recited in claim 6, wherein the substrate is removable.

18. A method of deploying, accessing, and stowing an informational display, said method comprising the steps of:
   a) removing an informational display device from a user's body, wherein said device is comprised of:
      i) a bi-stable ribbon defining a first flat configuration and a second curled position and wherein said bi-stable ribbon has a first surface and a second surface;
      ii) a substrate having a first end attached to said second surface, wherein said substrate is adapted to reside between said bi-stable ribbon and the user when the device is worn by the user, wherein said substrate has a first extended position and a second compressed position, wherein said substrate contains an informational display, and wherein said substrate is configured as a plurality of z-folds such that the width of each fold is no greater than approximately the width of the bi-stable ribbon; and
      iii) a second bi-stable ribbon at a second end of the device wherein the second bi-stable ribbon has a first flat position and a second curled position and wherein the bi-stable ribbon has a first surface attached to the distal end of the substrate and a second surface that contacts the user;
   b) expanding said substrate along the z-folds from the second compressed position to the first extended position;
   c) viewing said informational display;
   d) compressing said substrate along the z-folds from the first extended position to the second compressed position; and
   e) restoring said device on the user's body.

19. The method of claim 18, wherein the informational display device further comprises a unique RFID tag, and wherein the method further comprises the step of using the informational display device as a form of identification based on the unique RFID tag.

* * * * *